(12) United States Patent
Li et al.

(10) Patent No.: US 9,774,482 B2
(45) Date of Patent: Sep. 26, 2017

(54) HIGH EFFICIENCY SIGNAL FIELD ENHANCEMENT

(71) Applicant: Intel IP Corporation, Santa Clara, CA (US)

(72) Inventors: Qinghua Li, San Ramon, CA (US); Xiaogang Chen, Beijing (CN); Robert Stacey, Portland, OR (US); Yuan Zhu, Beijing (CN); Huaning Niu, Milpitas, CA (US)

(73) Assignee: Intel IP Corporation, Santa Clara, CA (US)

( * ) Notice: Subject to any disclaimer, the term of this patent is extended or adjusted under 35 U.S.C. 154(b) by 81 days.

(21) Appl. No.: 14/859,545

(22) Filed: Sep. 21, 2015

(65) Prior Publication Data

US 2017/0085406 A1  Mar. 23, 2017

(51) Int. Cl.
*H04W 84/12* (2009.01)
*H04L 27/26* (2006.01)
*H04L 5/00* (2006.01)

(52) U.S. Cl.
CPC ........ *H04L 27/2608* (2013.01); *H04L 5/0044* (2013.01); *H04W 84/12* (2013.01)

(58) Field of Classification Search
None
See application file for complete search history.

(56) References Cited

U.S. PATENT DOCUMENTS

2014/0307650 A1\* 10/2014 Vermani ............... H04L 5/0044
370/329

\* cited by examiner

*Primary Examiner* — Fan Ng
(74) *Attorney, Agent, or Firm* — Eversheds Sutherland (US) LLP (57) ABSTRACT

This disclosure describes methods, apparatus, and systems related to high efficiency signal field enhancement. A device may determine a wireless communication channel with a first device in accordance with a wireless communication standard. The device may generate a high efficiency preamble in accordance with a high efficiency communication standard, the high efficiency preamble including, at least in part, one or more legacy signal fields, one or more high efficiency signal fields, and one or more training fields. The device may determine one or more indication bits included in at least one of the one or more legacy fields. The device may determine a repetition pattern of at least one of the one or more high efficiency signal fields based at least in part, on the one or more indication bits. The device may cause to send the high efficiency preamble to the first device over the wireless communication channel.

16 Claims, 8 Drawing Sheets

HIGH EFFICIENCY SIGNAL FIELD ENHANCEMENT

TECHNICAL FIELD

This disclosure generally relates to systems and methods for wireless communications and, more particularly, to high efficiency SIGNAL field enhancement.

BACKGROUND

Wireless devices are becoming widely prevalent and are increasingly requesting access to wireless channels. A next generation WLAN, IEEE 802.11ax or High-Efficiency WLAN (HEW), is under development. HEW utilizes Orthogonal Frequency-Division Multiple Access (OFDMA) in channel allocation.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Wireless devices may send and receive data in the form of signals between a transmitting device and a receiving device. When a receiving device receives one or more signals from a transmitting device, the receiving device may decode the one or more signals in order to determine what is being communicated. The data being communicated may be preceded by preambles that may be comprised with one or more fields in accordance to various wireless communications standards. One of these communication standards may be the IEEE 802.11 ax (or HEW).

The decoding process of an IEEE 802.11ax preamble may include the decoding of the one or more fields. The one or more fields may include, at least in part a legacy SIGNAL field (L-SIG), a repeated legacy SIGNAL field (R-L-SIG), a high-efficiency SIGNAL field A (HE-SIG-A), and a high-efficiency SIGNAL field B (HE-SIG-B). Although a receiving device may operate at 80 MHz bandwidth, it may check the primary channel until the received HE-SIG-A is decoded. The reason is that the receiving device does not know the presence of the secondary subchannels until the bandwidth field in HE-SIG-A is decoded. Because of that, the HE-SIG-As in all the subchannels are defined to be the same. Namely, the payload bandwidth of HE-SIG-A is only 20 MHz, which can carry about 24 bits per OFDM symbol. The HE-SIG-A usually takes 2-4 symbols in this design. Even though the transmitter sends the HE-SIG-A in multiple subchannels, the receiver only takes the one in the primary subchannel and ignores the other. As a result, this may cause inefficiencies in bandwidth and power utilization because some of the transmitted information contained in the secondary sub-channels may cause interference with other channels. For example, if a user device knows the HE-SIG-A bandwidth, the user device may combine any repeated HE-SIG-A to enhance the decoding performance. However, if the bandwidth is unknown, the user device may not combine with other fields/symbols because the user device may erroneously combine the primary channel with noise or interference from other user devices.

Example embodiments of the present disclosure relate to systems, methods, and devices for high efficiency SIGNAL field enhancement to improve the transfer of data between a transmitting device and a receiving device using wireless communications. For example, the efficiency of bandwidth and power utilization may be enhanced by implementing one or more high-efficiency SIGNAL field modifications to enhance the determination of various identifying features of the high-efficiency SIGNAL fields at the receiving device. In some embodiments, some HE-SIG-A payloads may be shifted to a common part in HE-SIG-B such that the common part in the HE-SIG-B carries information that normally would have been decoded once the HE-SIG-A field is received at the receiving device. In other embodiments, the bandwidth may be signaled in L-SIG and R-L-SIG such that the receiving device may determine which subchannel(s) is used and whether one or more high-efficiency SIGNAL fields are to be repeated or not in the time domain or the frequency domain. In that case, after receiving the R-L-SIG field, the receiving device may know the presence of the subchannel(s), and HE-SIG-A may be sent in a payload bandwidth larger than 20 MHz. Consequently, the HE-SIG-A may not need to be repeated in the frequency domain since the bandwidth may be encoded in the L-SIG and/or R-L-SIG fields and the receiving device may be able to determine the bandwidth and the existence of the HE-SIG-A and/or HE-SIG-B fields.

Figure 1:
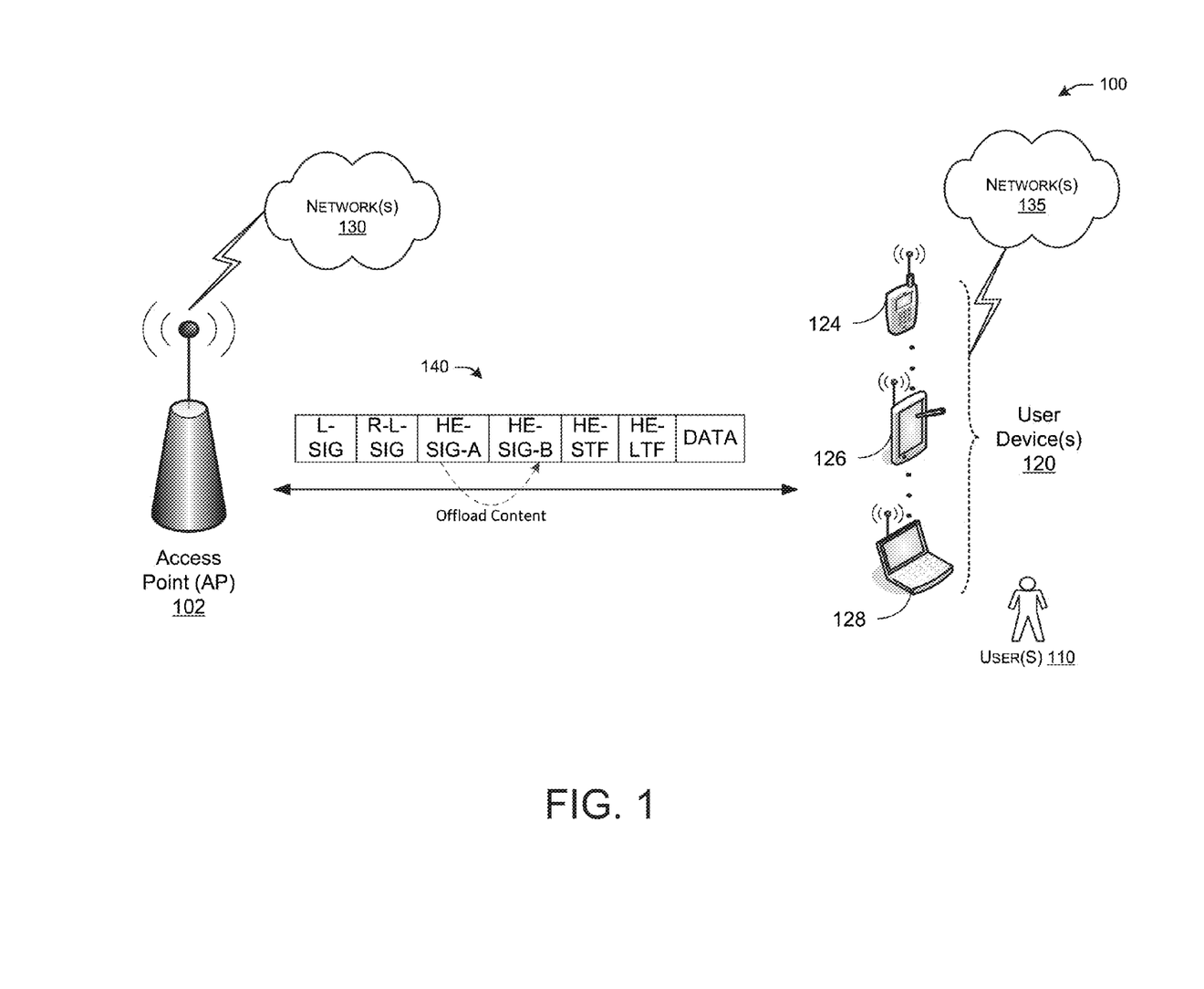
FIG. 1 depicts a network diagram illustrating an example network environment of an illustrative high efficiency SIGNAL field enhancement system, according to one or more example embodiments of the disclosure.

FIG. 1 is a network diagram illustrating an example network environment, according to some example embodiments of the present disclosure. Wireless network 100 can include one or more user devices 120 and one or more access point(s) (AP) 102, which may communicate in accordance with IEEE 802.11 communication standards, including IEEE 802.11 ax (HEW). The user device(s) 120 may be mobile devices that are non-stationary and do not have fixed locations. In some embodiments, the user devices 120 may include one or more computer systems similar to that of the functional diagram of FIG. 7 and/or the example machine/system of FIG. 8.

One or more illustrative user device(s) 120 may be operable by one or more user(s) 110. The user device(s) 120 (e.g., 124, 126, or 128) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.) and so forth.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennae. Communications antenna may be any suitable type of antenna corresponding to the communications protocols used by the user device(s) 120 (e.g., user devices 124, 124 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When the AP 102 establishes communication with one or more user devices 120 (e.g., user devices 124, 126, and/or 128), the AP 102 may communicate in the downlink direction by sending data frames. The data frames may be preceded by one or more preambles that may be part of one or more headers. These preambles may be used to allow the user device to detect a new incoming data frame from the AP 102. A preamble may be a signal used in network communications to synchronize transmission timing between two or more devices (e.g., between the APs and user devices).

In one embodiment, and with reference to FIG. 1, an HEW preamble (e.g., preamble 140) may include at least in part, a legacy SIGNAL field (L-SIG), a repeated legacy SIGNAL field (R-L-SIG), a high efficiency SIGNAL field A (HE-SIG-A), a high efficiency SIGNAL field B (HE-SIG-B), a high efficiency short training field (HE-STF), a high efficiency long training field (HE-LTF), and a data field that contains the data to be transmitted from the transmitting device (e.g., AP 102) to a receiving device (e.g., user devices 124, 126 and/or 128). The HE-SIG-A may contain payloads or content that may be pushed or offloaded to HE-SIG-B in order to reduce the bandwidth usage. In addition, "early bits" contained in the L-SIG and/or the R-L-SIG may signal to the receiving device (e.g., user device(s) 120) the used bandwidth and the presence of one or more high efficiency SIGNAL fields, such as, HE-SIG-A and/or HE-SIG-B. These early bits may be determined by analyzing the length field in the L-SIG and/or R-L-SIG communicated between the transmitting device (e.g., AP 102) and the receiving device (e.g., user device(s) 120). For example, a predetermined outcome may be based on an operation performed on the length field value, which in turn may determine how many bits may be encoded as early bits that would signal to the receiving device whether a certain outcome or setting is present. It is understood that the above acronyms may be different and are not to be construed as a limitation, as other acronyms maybe used for the fields included in an HEW preamble.

Figure 2:
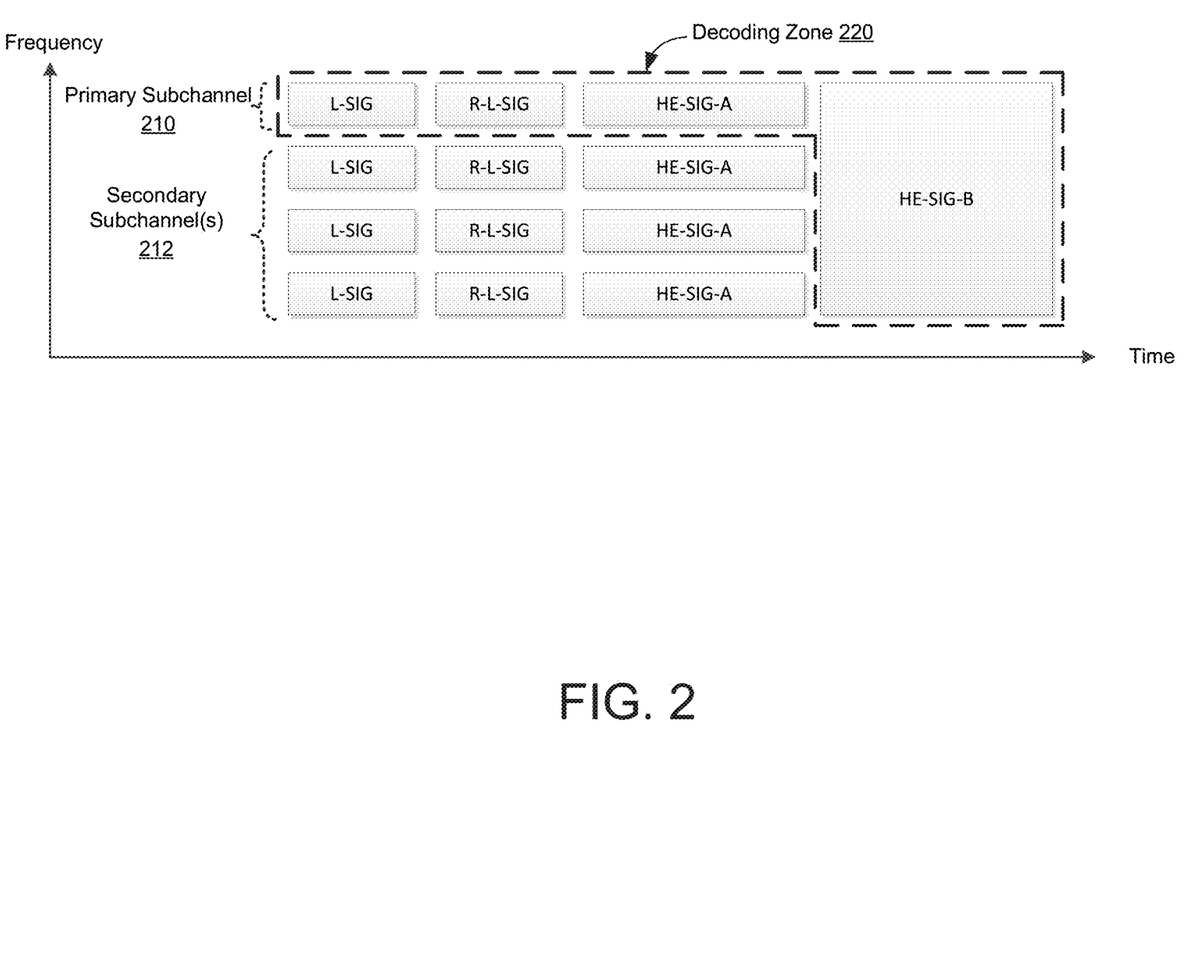
FIG. 2 depicts an illustrative schematic diagram of a high efficiency preamble structure.

FIG. 2 depicts an illustrative schematic diagram of an HEW preamble. It is understood that one or more subchannels may be used for the transmission of data between a transmitting device (e.g., between AP 102) and a receiving device (e.g., user device(s) 120) in HEW.

When a receiving device (e.g., user device 120) receives an IEEE 802.11ax preamble, such as preamble 140 shown in FIG. 1, the receiving device may decode that preamble. The decoding zone (e.g., decoding zone 220) of a IEEE 802.11ax preamble at the receiving device may include the decoding of the one or more fields, such as, the L-SIG field, the R-L-SIG field, the HE-SIG-A field, the HE-SIG-B field, etc. However, a receiving device (e.g., user device 120) may only check the primary subchannel (e.g., primary subchannel 210) in a wireless channel operating at, for example, an 80 MHz bandwidth, until the received HE-SIG-A is decoded. The reason is that the receiving device does not know the presence of the secondary subchannels (e.g., secondary subchannels 212). The receiving device usually only monitors the primary 20 MHz subchannel. Namely, the detections of Wi-Fi signal arrival and Clear Channel Assessment (CCA) are conducted on the primary 20 MHz subchannel. Because of that, the HE-SIG-As in all the subchannels are defined to be the same. Namely, the payload bandwidth of HE-SIG-A is only 20 MHz, which may carry about 24-26 bits per OFDM symbol. The HE-SIG-A may take 2-4 symbols in this case. Even though the transmitting device (e.g., AP 102) may send the HE-SIG-A in multiple subchannels, the receiving device (e.g., user device 120) may only process the HE-SIG-A in primary subchannel 210, and may ignore the other HE-SIG-As in the secondary subchannels 212. As a result, this may cause inefficiencies in bandwidth and power utilization because, for example, some of the transmitted information contained in the secondary sub-channels 212 may cause interference with other channels before being decoded as it is unclear what these fields are until being decoded. The primary 20 MHz subchannel may be any of the four 20 MHz subchannels of a 80 MHz channel.

Figure 3:
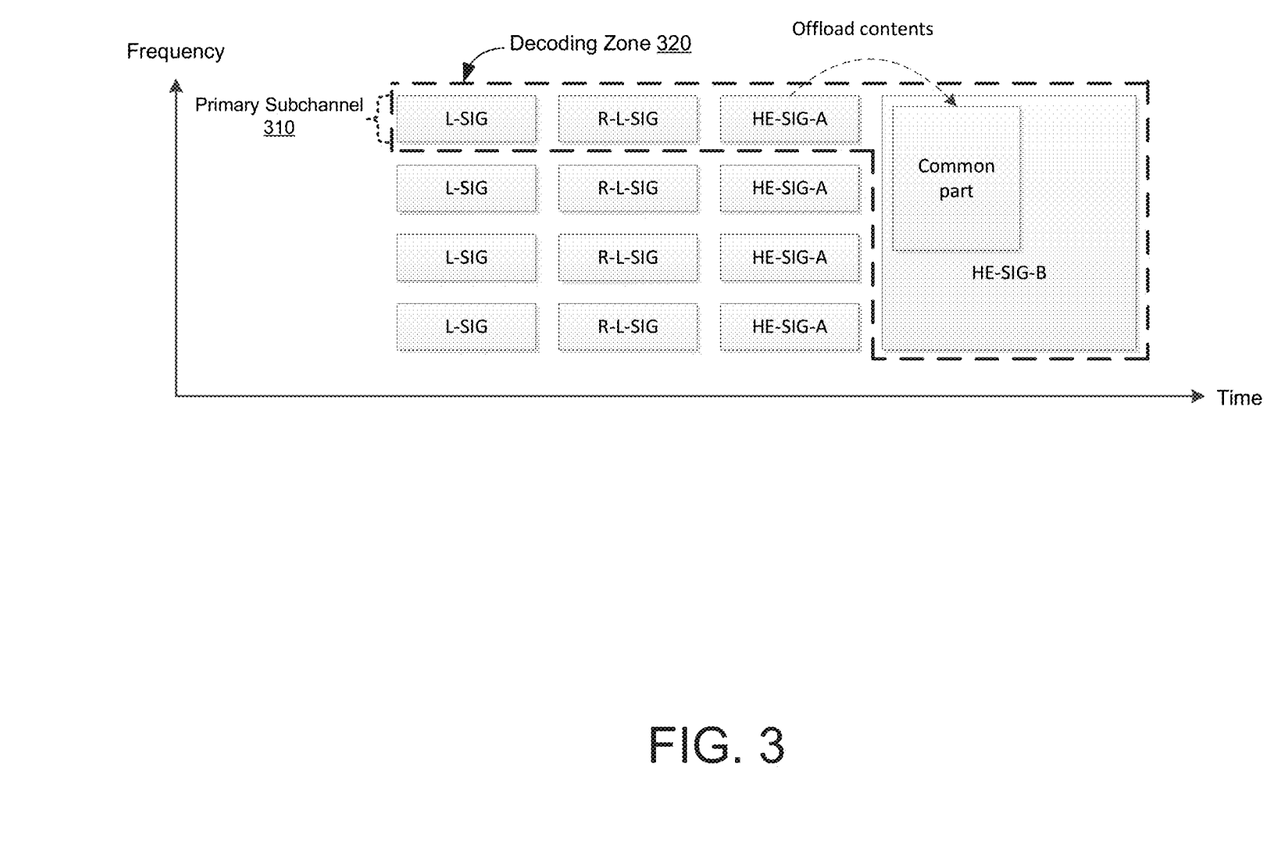
FIG. 3 depicts an illustrative schematic diagram of a high efficiency SIGNAL field enhancement system, in accordance with one or more example embodiments of the present disclosure.

FIG. 3 depicts an illustrative schematic diagram of a high efficiency SIGNAL field enhancement scheme, in accordance with one or more example embodiments of the present disclosure.

When decoding the received signals in the decoding zone 320, the receiving device decodes the primary subchannel (e.g., primary subchannel 310). In one embodiment, some information that may be typically contained in the received fields, such as the HE-SIG-A may be offloaded to a part of the HE-SIG-B. For example, the HE-SIG-B may include a common part and a set of user specific parts. The common part may be common to one or more user devices 120 and the user specific part may be specific to at least one of the user devices 120 that may receive the one or more fields sent from the transmitting device (e.g., AP 102). Some of the information that may be offloaded may include an indication of the repetition of the HE-SIG-A symbol, an indication of the HE-LTF symbol duration, and/or an indication of the guard interval (GI) length. These indications may be determined based on the characteristics of some of these fields. For example, the HE-SIG-A OFDM symbol may be repeated in time, the HE-LTF symbol duration may be 1× and 2× for indoor and 4× for outdoor, where the 2× means it is twice of the legacy LTF symbol duration and 4× means four times. In addition, the GI of an OFDM symbol may be around 1.6 and 3.2 microseconds for outdoor communications and around 0.8 microsecond for indoor communications. It is understood that other information contained in any field preceding the HE-SIG-B may be offloaded to common part of the HE-SIG-B.

In one embodiment, an indication of the number of HE-SIG-B OFDM symbols may be placed in HE-SIG-A. The receiving device (e.g., user device 120) may need to know whether there is one or multiple HE-SIG-B OFDM symbols. After the HE-SIG-B, the receiver may need to reset the automatic gain control (AGC). The indication of the HE-SIG-B OFDM symbol number may require 4 bits. For reducing the payload in the limited HE-SIG-A, one bit may be placed in HE-SIG-A and additional bits that indicate the HE-SIG-B symbol number may be placed in the common part of HE-SIG-B. One bit in HE-SIG-A is may be enough for signaling this information to the receiving device. For example, if there are three HE-SIG-B OFDM symbols, a bit in HE-SIG-A may be set to indicate that multiple, instead of one HE-SIG-B, OFDM symbols are being transmitted to the receiving device, and the exact number of OFDM symbols (e.g., 3) may be indicated by the indication bits in the common part of HE-SIG-B. In the case where there is only one HE-SIG-B OFDM symbol, this indication may be set in the HE-SIG-A so that the receiving device may have enough time to be ready for the training symbols (e.g., HE-STF for resetting the AGC, and HE-LTF). If there is only one HE-SIG-B OFDM symbol, the receiving device may reset the AGC while decoding the common part of HE-SIG-B. Otherwise, the receiving device may not have time to learn about the exact number of OFDM symbols from the common part of HE-SIG-B.

In one embodiment, the common part of the HE-SIG-B may be encoded with the rest of HE-SIG-B or separate from the rest of HE-SIG-B. In other words, the common part of the HE-SIG-B may be separate from the HE-SIG-B. Further, if the modulation and coding scheme (MCS) of the HE-SIG-B is predefined, that is, known, or signaled before the HE-SIG-B, and then the HE-SIG-A and the common part of the HE-SIG-B may be jointly encoded. Even for the information that the unscheduled user devices may need to know, for example, TXOP duration or PPDU duration, such also can be put into the common part of HE-SIG-B. Regarding the channel coding, the common part of HE-SIG-B may be encoded separately from the user device specific parts of HE-SIG-B. The common part of HE-SIG-B may be encoded separately from HE-SIG-A. If the MCS of HE-SIG-B is predefined, that is, known, or signaled before HE-SIG-B, HE-SIG-A, then the common part of HE-SIG-B may be jointly encoded.

Figure 4:
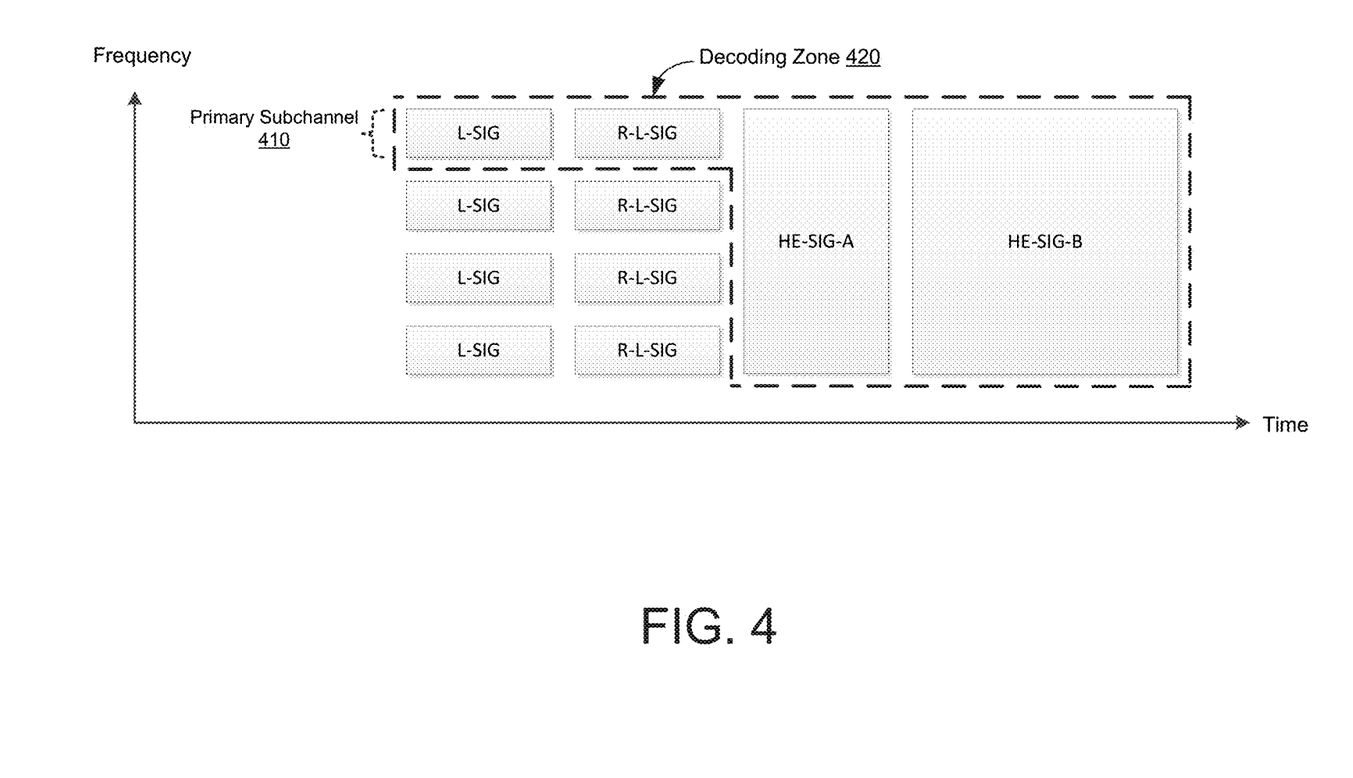
FIG. 4 depicts an illustrative schematic diagram a high efficiency SIGNAL field enhancement system, in accordance with one or more example embodiments of the present disclosure.

FIG. 4 depicts an illustrative schematic diagram of a high efficiency SIGNAL field enhancement scheme, in accordance with one or more example embodiments of the present disclosure.

In one embodiment, the bandwidth of the HE-SIG-A may be increased to be equivalent the bandwidth of the HE-SIG-B. Since the bandwidth of secondary subchannels may be signaled in L-SIG and R-L-SIG, for example, using early bits, the receiving device (e.g., user device 120) may know the bandwidth of HE-SIG-A or the presence of the available secondary subchannels. Therefore, the bandwidth of HE-SIG-A may be set to be greater than 20 MHz, e.g., the same bandwidth as HE-SIG-B as shown in FIG. 4. This in turn may change the decoding zone (e.g., decoding zone 420) to include the width of the HE-SIG-A, which may greater that the 20 MHz. This may increase the efficiency of HE-SIG-A by multiple times as compared to repeating HE-SIG-A in frequency as shown, for example, in FIG. 2. The bandwidth of the primary subchannel may not change. For example, the primary 20 MHz (or 40 MHz or 80 MHz) subchannel may still be the same. Therefore, the HE-SIG-A or HE-SIG-B that exceeds the bandwidth of the primary subchannel may only be partially in the primary subchannel.

In one embodiment, an indication of whether one or more of the high efficiency SIGNAL fields (e.g., HE-SIG-A and/or HE-SIG-B) are repeated in time and/or frequency domains may be provided by one or more SIGNAL fields (e.g., L-SIG and/or R-L-SIG). The received data fields L-SIG and R-L-SIG may be utilized to send what will be referred to in this disclosure as "early bits." Early bits may come from, for example, the "dirty bit" in the length field of L-SIG and/or the "piggybacked bits" in the R-L-SIG. The piggybacked bits may be set by modulating the polarity of the data symbols on the subcarriers of the R-L-SIG OFDM symbol, for example, based on the orientation of the data symbols of the subcarriers of R-L-SIG symbol. For example, the length field value may be utilized to carry the early bits that may enhance the decoding of the HE-SIG-A field at the receiving device side.

In one embodiment, the early bits may indicate whether the HE-SIG-A was repeated in time and/or frequency so that the receiver device (e.g., user devices 120) may combine the one or more of the HE-SIG-A and the repeated HE-SIG-A before decoding the HE-SIG-A. In one embodiment, the "dirty bit" may be 0-1 bit and piggybacked bits may be 0-4 bits. The HE-SIG-A may be repeated in frequency, e.g., over the sub-channels and in time, e.g., across OFDM symbols. The early bits may be used to indicate the actual bandwidth, repetition pattern and the guard interval (GI) duration, e.g., 0.8 or 1.6 microseconds of the HE-SIG-A. If the receiver knows the repetition pattern of HE-SIG-A before decoding HE-SIG-A, it may combine the repeated signals for boosting the performance. Even if there may be insufficient bits to indicate the whole repetition pattern, indicating one repeated copy may provide around 3 dB combining gain.

In one embodiment, if the total number of early bits is 1, there may be three options for utilizing the single bit. For example, the single early bit may indicate whether HE-SIG-A is repeated in time domain. The single early bit may indicate whether HE-SIG-A is repeated in frequency in the first secondary subchannel for contiguous channel bonding. The single early bit may indicate whether the HE-SIG-A payload bandwidth 20 MHz or 40 MHz. If it is 40 MHz, the content of HE-SIG-A may be spread over the primary 20 MHz subchannel and the secondary 20 MHz subchannel for contiguous channel bonding.

In another embodiment, if the total number of early bits is 2, these bits may indicate four combinations for signaling the HE-SIG-A payload bandwidth, frequency/time repetition pattern, and GI duration. HE-SIG-A payload bandwidth and frequency/time repetition pattern and GI duration may share the combinations indexed by the early bits. For example, the early bits may indicate whether HE-SIG-A is repeated in time domain and whether the first secondary subchannel is used. In another example, the early bits may indicate whether HE-SIG-A is repeated in frequency. There may be four combinations for contiguous channel bonding: 1) 20 MHz with only primary subchannel; 2) 40 MHz with the primary 20 MHz subchannel and the first 20 MHz secondary subchannel; 3) 80 MHz with the primary and three secondary subchannels; 4) 160 MHz with two 80 MHz channels. The four combinations may be used for non-contiguous channel bonding if non-contiguous channel bond is supported by IEEE 802.11ax standard. There may be 8 combinations describing the usages of the three secondary subchannels in 80 MHz. Four of them may be indicated by the early bits. For example, 0 may indicate that no secondary subchannels are available; 1 may indicate the 1st secondary subchannel is used; 2 may indicate the 2nd secondary subchannel is used; 3 may indicate the 3rd secondary subchannel is used.

In another example, the early bit may indicate four mixed combinations of the actual bandwidth and repetition pattern. For example, a minimum of about 3 dB combining gain may be achieved. Zero ("0") may indicate that no repetition in time and frequency and only 20 MHz primary channel available; 1 may be for time domain repetition with a 20 MHz primary channel available; 2 may be for frequency domain repetition with a first secondary subchannel available; 3 may be for 40 MHz HE-SIG-A payload bandwidth without any frequency/time repetition.

In another embodiment, if the total number of early bits is 3, these bits may indicate eight combinations for signaling HE-SIG-A payload bandwidth and frequency/time repetition pattern and GI duration. HE-SIG-A payload bandwidth and frequency/time repetition pattern and GI duration can share the combinations indexed by the early bits.

For example, the early bits indicate whether HE-SIG-A is repeated in time domain and which of the (three) secondary subchannels are used. One bit may be for the time domain repetition. The other two bits may be for indicating the used bandwidth, e.g., 20, or 40, or 80, or 160 MHz. For contiguous channel bonding, this may be enough. For non-contiguous channel bonding, the two bits may only indicate which secondary subchannel among the three possible secondary subchannels of the 80 MHz is used. It may be enough to indicate 4 cases: none, 1st, 2nd, 3rd secondary subchannel. The HE-SIG-A may spread over 40 MHz. Alternatively, HE-SIG-A may only spread over 20 MHz and repeat in the other 20 MHz.

In another embodiment, if the total number of early bits is 4, these bits may indicate 16 combinations for signaling HE-SIG-A payload bandwidth and frequency/time repetition pattern and GI duration. HE-SIG-A payload bandwidth and frequency/time repetition pattern and GI duration may share the combinations indexed by the early bits. In one example, the early bits may indicate whether HE-SIG-A is repeated in the time domain and which of the (three) secondary subchannels are used. One early bit may be used for the time domain repetition. The other three bits may be used for indicating which of the three secondary subchannels are used. Since GI indication may be less important than bandwidth/repetition indication, the number of the early bits may be small, e.g., less than 3. It is understood that all the above are various example scenarios, and are not meant to be a limitation.

Figure 5:
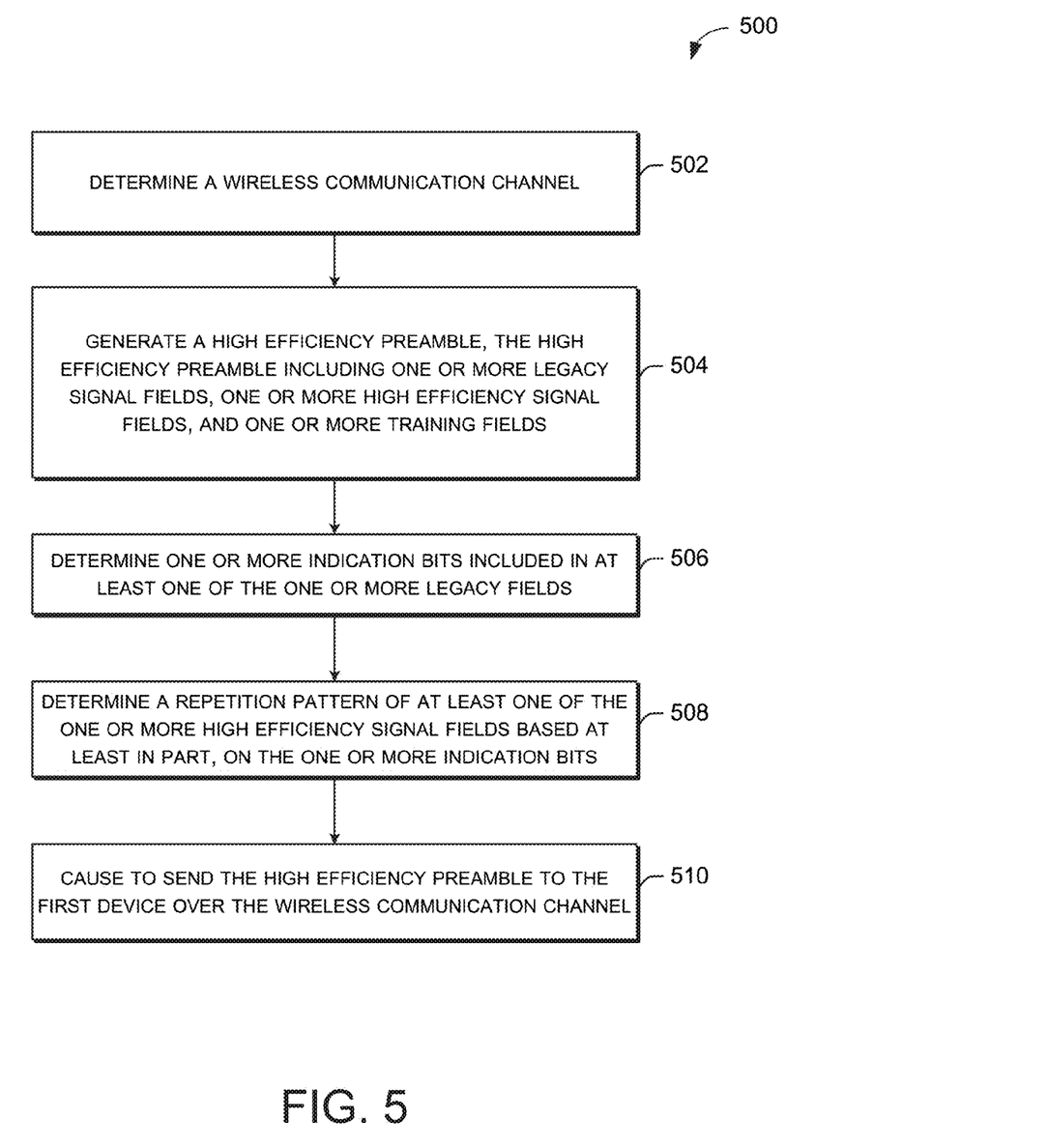
FIG. 5 depicts a flow diagram of an illustrative process for a high efficiency SIGNAL field enhancement system, in accordance with one or more embodiments of the disclosure.

FIG. 5 illustrates a flow diagram of illustrative process 500 for a high efficiency SIGNAL field enhancement scheme, in accordance with one or more embodiments of the disclosure.

At block 502, an AP may determine a wireless communication channel with a user device in accordance with a wireless communication standard. The wireless communication channel may include at least one of a primary sub-channel and one or more secondary sub-channels. At the receiving side, the receiving device may perform the decoding of received fields in the primary sub-channel first before any of the one or more secondary sub-channels because the receiving device may not be aware of these secondary sub-channels until one of the high efficiency fields has been decoded.

At block 504, the AP may generate a high efficiency preamble in accordance with a high efficiency communication standard (e.g., HEW), the high efficiency preamble including, at least in part, one or more legacy SIGNAL fields, one or more high efficiency SIGNAL fields, and one or more training fields. The one or more high efficiency SIGNAL fields may include at least one of a high efficiency SIGNAL A (HE-SIG-A) field and a high efficiency SIGNAL B (HE-SIG-B) field. When the HE-SIG-A field has been decoded, the HE-SIG-A may contain various payload information.

At block 506, the AP may determine one or more indication bits included in at least one of the one or more legacy fields. The one or more indication bits may be included in a legacy SIGNAL (L-SIG) field or a repeated legacy SIGNAL (R-L-SIG) field of the high efficiency preamble. The one or more indication bits may be associated with a bandwidth of the wireless communication channel. The one or more indication bits may be referred to as "early bits," which based on how they are set, the AP may indicate to the receiving device (e.g., user devices) what the bandwidth of the field is or whether there is repetition in one or more of the fields included in the high efficiency preamble. In another example, the HE-SIG-A field may include an indication of a number of HE-SIG-B symbols included in the HE-SIG-B field. This may allow the receiving device to determine the length and duration of the HE-SIG-B field, which may be composed of one or more HE-SIG-B OFDM symbols.

At block 508, the AP may determine a repetition pattern of at least one of the one or more high efficiency SIGNAL fields based at least in part, on the one or more indication bits. For example, repetition pattern may include at least one of a repetition in a frequency domain or a repetition in a time domain. In some embodiment, the AP may offload one or more payload items from HE-SIG-A to HE-SIG-B. The one or more payload items may include at least one of an indication of the repetition of the HE-SIG-A field, an indication of a duration of at least one of the one or more training fields, and/or an indication of a guard interval (GI) length.

At block 510, the AP may cause to send the high efficiency preamble to the receiving device over the wireless communication channel.

Figure 6:
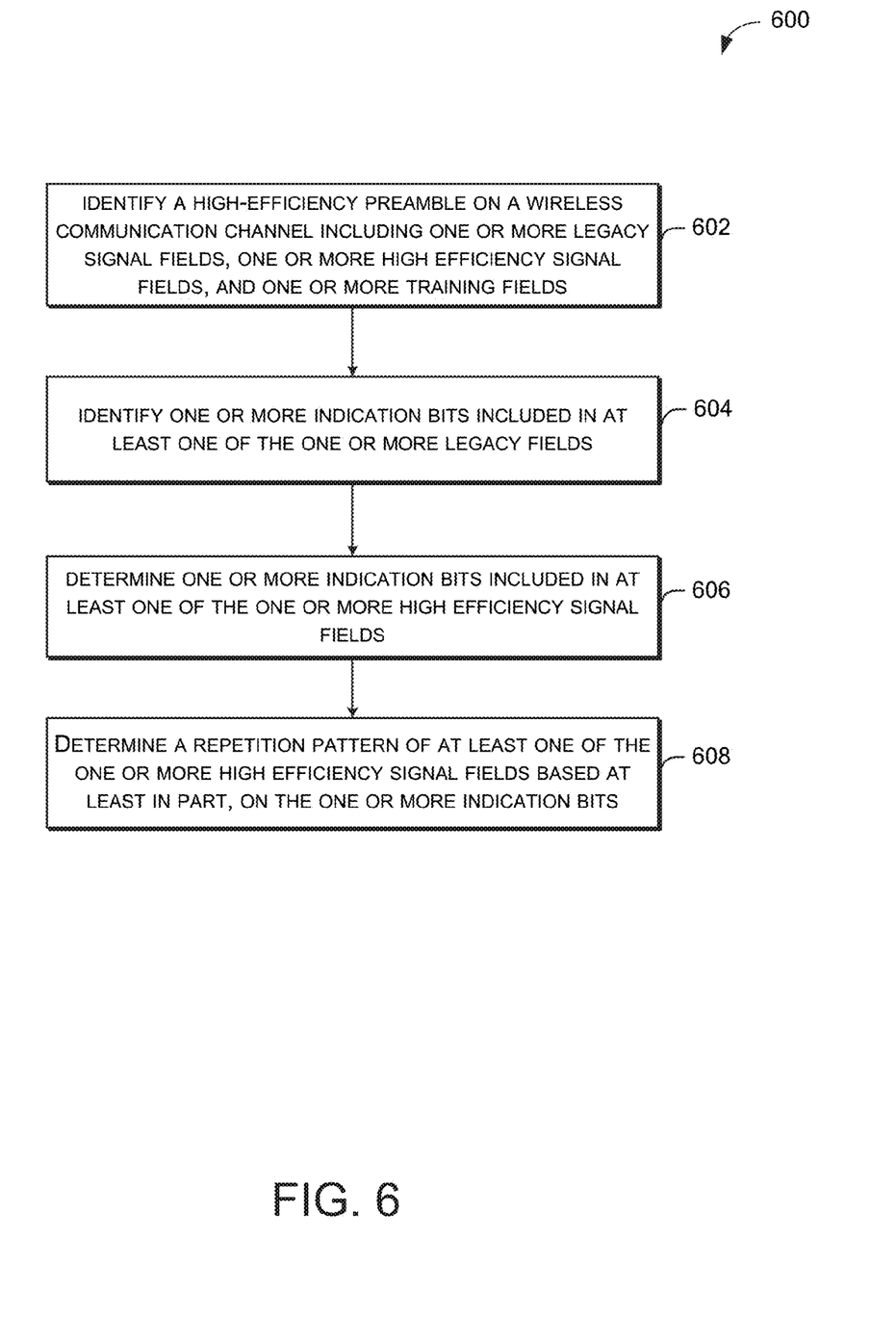
FIG. 6 depicts a flow diagram of an illustrative process for a high efficiency SIGNAL field enhancement system, in accordance with one or more embodiments of the disclosure.

FIG. 6 illustrates a flow diagram of illustrative process 600 for high efficiency SIGNAL field enhancement scheme, in accordance with one or more embodiments of the disclosure.

At block 602, a user device may identify a high-efficiency preamble on a wireless communication channel in accordance with a high-efficiency communication standard (e.g., HEW), received from an AP, the high efficiency preamble including, at least in part, one or more legacy SIGNAL fields (e.g., L-SIG and/or R-L-SIG fields), one or more high efficiency SIGNAL fields, and one or more training fields. The one or more high efficiency SIGNAL fields may include at least one of a high efficiency SIGNAL A (HE-SIG-A) field and a high efficiency SIGNAL B (HE-SIG-B) field.

At block 604, the user device may identify one or more indication bits included in at least one of the one or more legacy fields. The one or more indication bits may be referred to as "early bits," which based on how they are set by the AP, may indicate to the user device what the bandwidth of the field is or whether there is repetition in one or more of the fields included in the high efficiency preamble. The "early bits" contained in the L-SIG and/or the R-L-SIG may signal to the receiving device (e.g., user device(s) 120) the used bandwidth and the presence of one or more high efficiency SIGNAL fields, such as, HE-SIG-A and/or HE-SIG-B. These early bits may be determined by analyzing the length field in the L-SIG and/or R-L-SIG communicated between the transmitting device (e.g., AP 102) and the receiving device (e.g., user device(s) 120). For example, a predetermined outcome may be based on an operation performed on the length field value, which in turn may determine how many bits may be encoded as early bits that would signal to the receiving device whether certain outcome or setting is present. It is understood that the above acronyms may be different and are not to be construed as a limitation, as other acronyms maybe used for the fields included in an HEW preamble.

At block 606, the user device may determine a repetition pattern of at least one of the one or more high efficiency SIGNAL fields based at least in part, on the one or more indication bits. The early bits may indicate whether the HE-SIG-A was repeated in time and/or frequency so that the receiver device (e.g., user devices 120) may combine the one or more of the HE-SIG-A and the repeated HE-SIG-A before decoding the HE-SIG-A. For example, single early bit may indicate whether HE-SIG-A is repeated in time domain. The single early bit may indicate whether HE-SIG-A is repeated in frequency in the first secondary subchannel for contiguous channel bonding. The single early bit may indicate whether the HE-SIG-A payload bandwidth 20 MHz or 40 MHz.

Figure 7:
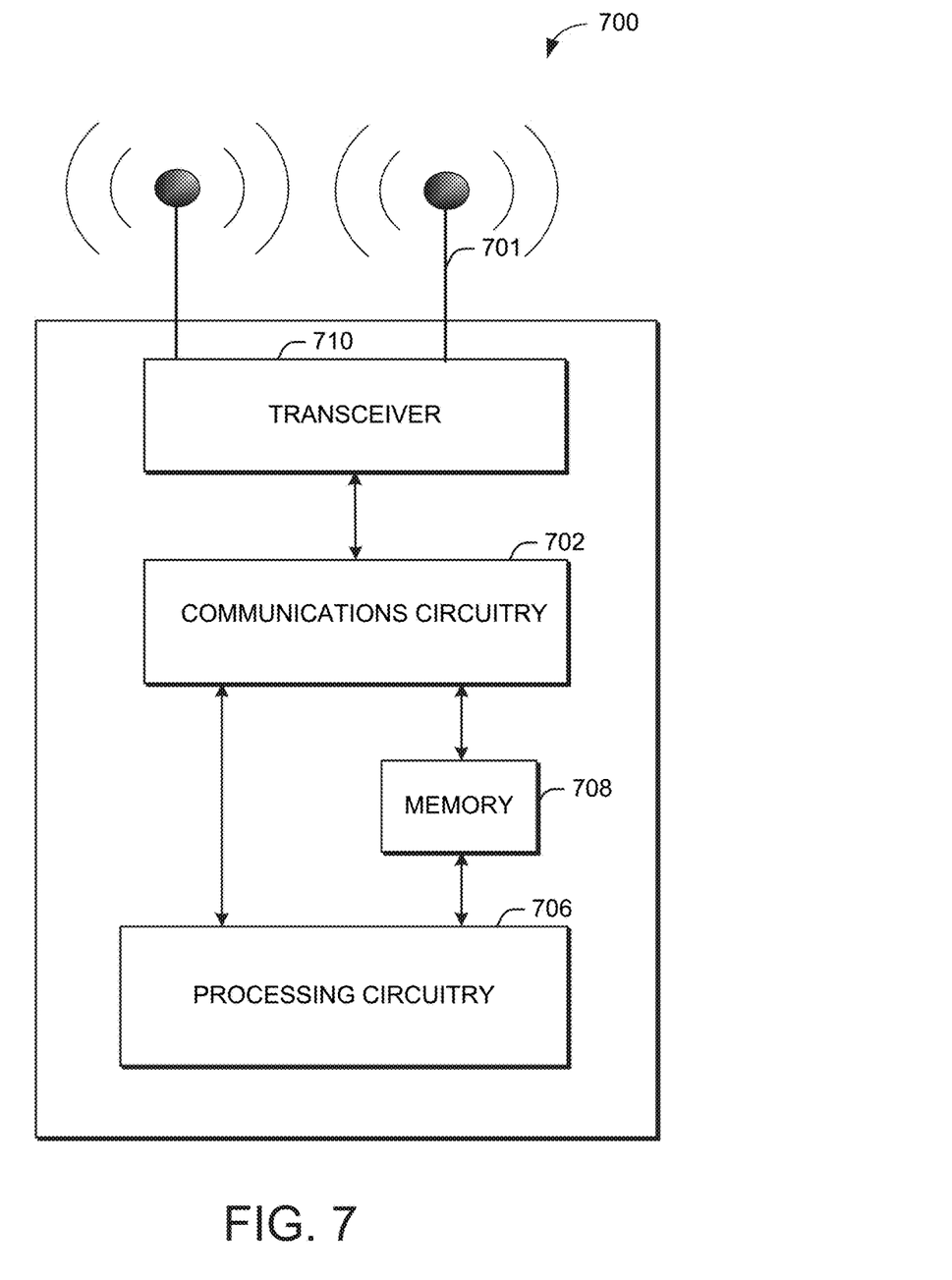
FIG. 7 illustrates a functional diagram of an example communication station that may be suitable for use as a user device, in accordance with one or more example embodiments of the disclosure.

FIG. 7 shows a functional diagram of an exemplary communication station 700 in accordance with some embodiments. In one embodiment, FIG. 7 illustrates a functional block diagram of a communication station that may be suitable for use as an AP 102 (as illustrated in FIG. 1) or communication station user device 120 (as illustrated in FIG. 1) in accordance with some embodiments. The communication station 700 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in FIGS. 2-6.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device may, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a non-transitory computer-readable storage device, which may be read and executed by at least one processor to perform the operations described herein. The instructions may be in any suitable form, such as but not limited to source code, compiled code, interpreted code, executable code, static code, dynamic code, and the like. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device memory.

Figure 8:
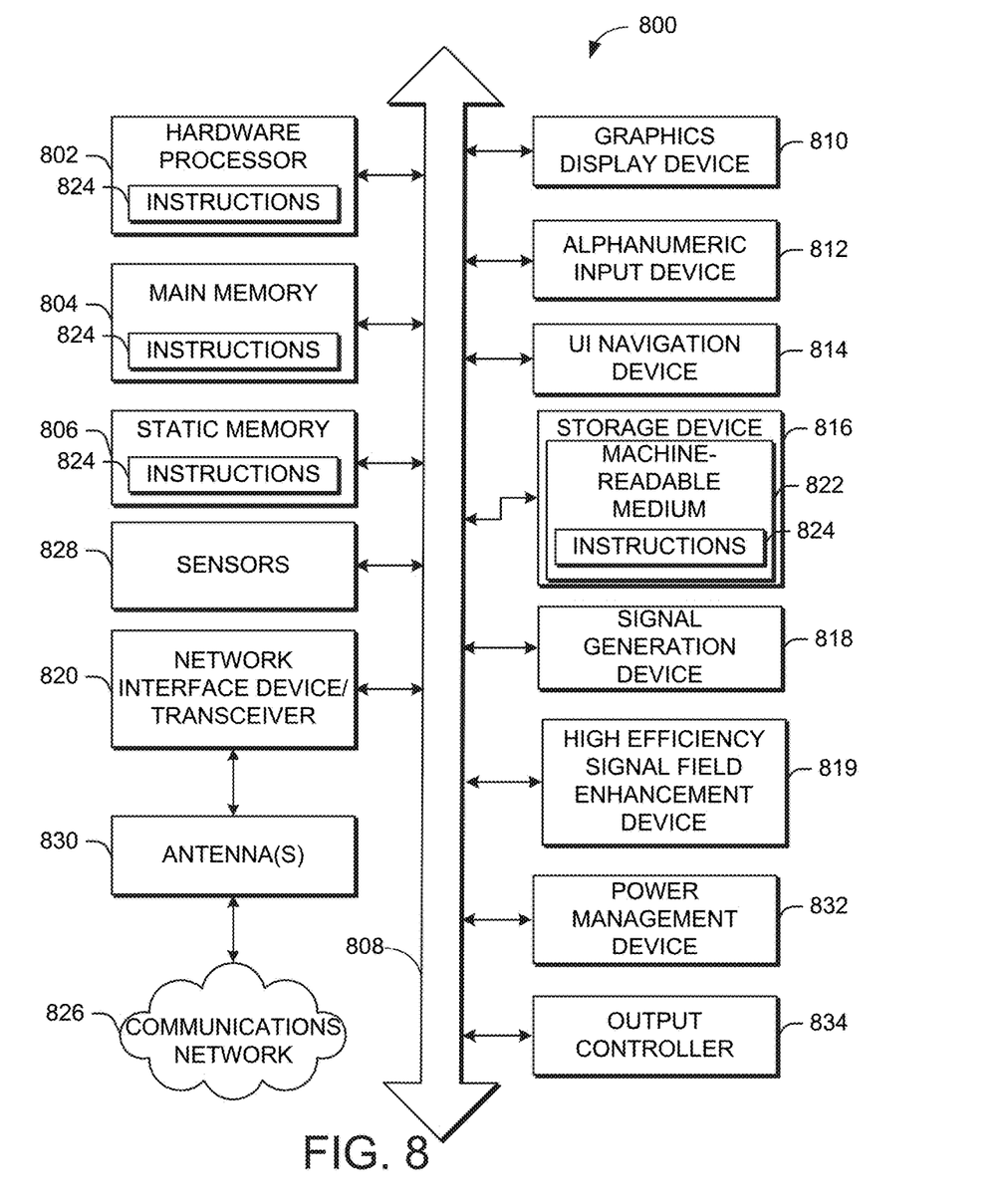
FIG. 8 is a block diagram of an example machine upon which any of one or more techniques (e.g., methods) may be performed, in accordance with one or more embodiments of the disclosure.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), a high efficiency SIGNAL field enhancement device 819, a network interface device/transceiver 820 coupled to antenna(s) 830, and one or more sensors 828, such as a global positioning system (GPS) sensor, compass, accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The high efficiency SIGNAL field enhancement device 819 may be configured to offload some information that is typically contained in some fields of an HEW preamble, such as, HE-SIG-A to a part of an HE-SIG-B field of the HEW preamble. For example, the HE-SIG-B may include a common part and a user specific part. The common part may be common to one or more user devices 120 and the user specific part may be specific to at least one of the user devices 120 that may receive the one or more fields sent from the transmitting device (e.g., AP 102).

The high efficiency SIGNAL field enhancement device 819 may be configured to provide an indication of the number of HE-SIG-B OFDM symbols that may be placed in HE-SIG-A. One bit in HE-SIG-A may be enough for signaling this information to the receiving device. For example, if there are three HE-SIG-B OFDM symbols the high efficiency SIGNAL field enhancement system may set a bit in HE-SIG-A to indicate that three HE-SIG-B OFDM symbols are being transmitted to the receiving device.

The high efficiency SIGNAL field enhancement device 819 may be configured to provide additional indication to reset the automatic gain control (AGC) when only one HE-SIG-B OFDM symbol may be included in the HEW preamble because having one HE-SIG-B OFDM symbol may not allow the receiving device to have enough time to be ready for the training symbols (e.g., HE-STF, and HE-LTF). If there is only one HE-SIG-B OFDM symbol, the receiving device may need to reset the AGC while decoding the common part of HE-SIG-B. Otherwise, the receiving device may not have time to learn about the exact number of OFDM symbols from the common part of HE-SIG-B.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a device, including at least one memory that stores computer-executable instructions. At least one processor of the one or more processors configured to access the at least one memory, where the at least one processor of the one or more processors is configured to execute the computer-executable instructions to determine a wireless communication channel with a first device in accordance with a wireless communication standard. The one or more processors is configured to execute the computer-executable instructions to generate a high efficiency preamble in accordance with a high efficiency communication standard, the high efficiency preamble including, at least in part, one or more legacy SIGNAL fields, one or more high efficiency SIGNAL fields, and one or more training fields. The one or more processors is configured to execute the computer-executable instructions to determine one or more indication bits included in at least one of the one or more legacy fields. The one or more processors is configured to execute the computer-executable instructions to determine a repetition pattern of at least one of the one or more high efficiency SIGNAL fields based at least in part, on the one or more indication bits. The one or more processors is configured to execute the computer-executable instructions to cause to send the high efficiency preamble to the first device over the wireless communication channel. Other embodiments of this aspect include corresponding computer systems, apparatus, and computer programs recorded on one or more computer storage devices, each configured to perform the actions of the methods.

According to example embodiments of the disclosure, there may be a device. The device may include at least one memory that stores computer-executable instructions, and at least one processor of the one or more processors configured to access the at least one memory, wherein the at least one processor of the one or more processors is configured to execute the computer-executable instructions to determine a wireless communication channel with a first device in accordance with a wireless communication standard. The at least one processor of the one or more processors may be configured to execute the computer-executable instructions to generate a high efficiency preamble in accordance with a high efficiency communication standard, the high efficiency preamble including, at least in part, one or more legacy signal fields, one or more high efficiency signal fields, and one or more training fields. The at least one processor of the one or more processors may be configured to execute the computer-executable instructions to determine one or more indications included in at least one of the one or more legacy fields. The at least one processor of the one or more processors may be configured to execute the computer-executable instructions to determine a repetition pattern of at least one of the one or more high efficiency signal fields based at least in part, on the one or more indications. The at least one processor of the one or more processors may be configured to execute the computer-executable instructions to cause to send the high efficiency preamble to the first device over the wireless communication channel.

Implementations may include one or more of the following features. The one or more high efficiency signal fields include at least one of a high efficiency signal A (HE-SIG-A) field and a high efficiency signal B (HE-SIG-B) field. The at least one processor of the one or more processors is further configured to execute the computer-executable instructions to offload one or more payload items of the HE-SIG-A field to the HE-SIG-B field. The one or more payload items include at least one of an indication of the repetition of the HE-SIG-A field, an indication of a duration of at least one of the one or more training fields, or an indication of a guard interval (GI) length. The HE-SIG-A field may include an indication of a number of HE-SIG-B symbols included in the HE-SIG-B field. The repetition pattern may include at least one of a repetition in a frequency domain or a repetition in a time domain. The wireless communication channel may include at least one of a primary sub-channel and one or more secondary sub-channels. The one or more indications are associated with a bandwidth of the wireless communication channel. The one or more indications are included in a legacy signal (L-SIG) field or a repeated legacy signal (R-L-SIG) field. The device may further include a transceiver configured to transmit and receive wireless signals. The device may further include an antenna coupled to the transceiver. The device may further include one or more processors in communication with the transceiver.

In example embodiments of the disclosure, there may be a non-transitory computer-readable medium storing computer-executable instructions which, when executed by a processor, cause the processor to perform operations. The operations may include identifying a high-efficiency preamble on a wireless communication channel in accordance with a high-efficiency communication standard, received from a first device, the high efficiency preamble including, at least in part, one or more legacy signal fields, one or more high efficiency signal fields, and one or more training fields. The operations may include identifying one or more indications included in at least one of the one or more legacy fields. The operations may include determining a repetition pattern of at least one of the one or more high efficiency signal fields based at least in part, on the one or more indications.

Implementations may include one or more of the following features. the one or more high efficiency signal fields include at least one of a high efficiency signal A (HE-SIG-A) field and a high efficiency signal B (HE-SIG-B) field. the operations may further include decoding one or more payload items from a common part of the HE-SIG-B field. the one or more payload items may include at least one of an indication of the repetition of the HE-SIG-A field, an indication of a duration of at least one of the one or more training fields, or an indication of a guard interval (GI) length. The HE-SIG-B field may include a common HE-SIG-B part and a user specific HE-SIG-B part. The repetition pattern may include at least one of a repetition in a frequency domain or a repetition in a time domain. The wireless communication channel may include at least one of a primary sub-channel and one or more secondary sub-channels. The one or more indications are associated with a bandwidth of the wireless communication channel. The one or more indications are included in a legacy signal (L-SIG) field or a repeated legacy signal (R-L-SIG) field.

In example embodiments of the disclosure, there may be a method for wireless communication. The method may include determining a wireless communication channel with a first device in accordance with a wireless communication standard. The method may include generating a high efficiency preamble in accordance with a high efficiency communication standard the high efficiency preamble including, at least in part, one or more legacy signal fields, one or more high efficiency signal fields, and one or more training fields. The method may include determining one or more indications included in at least one of the one or more legacy fields. The method may include determining a repetition pattern of at least one of the one or more high-efficiency fields based at least in part, on the one or more indications. The method may include causing to send the high efficiency preamble to the first device over the wireless communication channel.

In example embodiments of the disclosure, there may be a wireless communication apparatus. The apparatus may include means for identifying a high-efficiency preamble on a wireless communication channel in accordance with a high-efficiency communication standard, received from a first device, the high efficiency preamble including, at least in part, one or more legacy signal fields, one or more high efficiency signal fields, and one or more training fields. The wireless communication apparatus may include means for identifying one or more indications included in at least one of the one or more legacy fields. The wireless communication apparatus may include means for determining a repetition pattern of at least one of the one or more high efficiency signal fields based at least in part, on the one or more indications.

Implementations may include one or more of the following features. The one or more high efficiency signal fields include at least one of a high efficiency signal A (HE-SIG-A) field and a high efficiency signal B (HE-SIG-B) field. The wireless communication apparatus may further include means for decoding one or more payload items from a common part of the HE-SIG-B field. The one or more payload items include at least one of an indication of the repetition of the HE-SIG-A field, an indication of a duration of at least one of the one or more training fields, or an indication of a guard interval (GI) length. The HE-SIG-B field may include a common HE-SIG-B part and a user specific HE-SIG-B part. The repetition pattern may include at least one of a repetition in a frequency domain or a repetition in a time domain. The wireless communication channel may include at least one of a primary sub-channel and one or more secondary sub-channels. The one or more indications are associated with a bandwidth of the wireless communication channel.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
    at least one memory that stores computer-executable instructions; and
    at least one processor of the one or more processors configured to access the at least one memory, wherein the at least one processor of the one or more processors is configured to execute the computer-executable instructions to:
        determine a wireless communication channel with a first device in accordance with a wireless communication standard;
        generate a high efficiency preamble in accordance with a high efficiency communication standard, the high efficiency preamble including, at least in part, one or more legacy signal fields, one or more high efficiency signal fields, and one or more training fields, wherein the one or more high efficiency signal fields comprise at least one of a high efficiency signal A (HE-SIG-A) field and a high efficiency signal B (HE-SIG-B) field;
        determine one or more indications included in at least one of the one or more legacy fields;
        offload one or more payload items of the HE-SIG-A field to the HE-SIG-B field;
        determine a repetition pattern of at least one of the one or more high efficiency signal fields based at least in part, on the one or more indications; and
        cause to send the high efficiency preamble to the first device over the wireless communication channel.

2. The device of claim 1, wherein the one or more payload items include at least one of an indication of the repetition of the HE-SIG-A field, an indication of a duration of at least one of the one or more training fields, or an indication of a guard interval (GI) length.

3. The device of claim 1, wherein the HE-SIG-A field includes an indication of a number of HE-SIG-B symbols included in the HE-SIG-B field.

4. The device of claim 1, wherein the repetition pattern includes at least one of a repetition in a frequency domain or a repetition in a time domain.

5. The device of claim 1, wherein the wireless communication channel includes at least one of a primary sub-channel and one or more secondary sub-channels.

6. The device of claim 1, wherein the one or more indications are associated with a bandwidth of the wireless communication channel.

7. The device of claim 1, wherein the one or more indications are included in a legacy signal (L-SIG) field or a repeated legacy signal (R-L-SIG) field.

8. The device of claim 1, further comprising:
    a transceiver configured to transmit and receive wireless signals;
    an antenna coupled to the transceiver; and
    one or more processors in communication with the transceiver.

9. A non-transitory computer-readable medium storing computer-executable instructions which when executed by one or more processors result in performing operations comprising:
    identifying a high-efficiency preamble on a wireless communication channel in accordance with a high-efficiency communication standard, received from a first device, the high efficiency preamble including, at least in part, one or more legacy signal fields, one or more high efficiency signal fields, and one or more training fields, wherein the one or more high efficiency signal fields comprise at least one of a high efficiency signal A (HE-SIG-A) field and a high efficiency signal B (HE-SIG-B) field;
    identifying one or more indications included in at least one of the one or more legacy fields;

determining a repetition pattern of at least one of the one or more high efficiency signal fields based at least in part, on the one or more indications; and decoding one or more payload items from a common part of the HE-SIG-B field.

10. The non-transitory computer-readable medium of claim 9, wherein the one or more payload items include at least one of an indication of the repetition of the HE-SIG-A field, an indication of a duration of at least one of the one or more training fields, or an indication of a guard interval (GI) length.

11. The non-transitory computer-readable medium of claim 9, wherein the HE-SIG-B field includes a common HE-SIG-B part and a user specific HE-SIG-B part.

12. The non-transitory computer-readable medium of claim 9, wherein the repetition pattern includes at least one of a repetition in a frequency domain or a repetition in a time domain.

13. The non-transitory computer-readable medium of claim 9, wherein the wireless communication channel includes at least one of a primary sub-channel and one or more secondary sub-channels.

14. The non-transitory computer-readable medium of claim 9, wherein the one or more indications are associated with a bandwidth of the wireless communication channel.

15. The non-transitory computer-readable medium of claim 9, wherein the one or more indications are included in a legacy signal (L-SIG) field or a repeated legacy signal (R-L-SIG) field.

16. A method comprising:

determining a wireless communication channel with a first device in accordance with a wireless communication standard;

generating a high efficiency preamble in accordance with a high efficiency communication standard the high efficiency preamble including, at least in part, one or more legacy signal fields, one or more high efficiency signal fields, and one or more training fields, wherein the one or more high efficiency signal fields comprise at least one of a high efficiency signal A (HE-SIG-A) field and a high efficiency signal B (HE-SIG-B) field;

determining one or more indications included in at least one of the one or more legacy fields;

offloading one or more payload items of the HE-SIG-A field to the HE-SIG-B field;

determining a repetition pattern of at least one of the one or more high efficiency fields based at least in part on the one or more indications; and causing to send the high efficiency preamble to the first device over the wireless communication channel.

\* \* \* \* \*